US011804873B1

(12) United States Patent
Zipperer et al.

(10) Patent No.: US 11,804,873 B1
(45) Date of Patent: Oct. 31, 2023

(54) BASEBAND REFLECTION MODULATION ON POWER LINES

(71) Applicant: TEXAS INSTRUMENTS INCORPORATED, Dallas, TX (US)

(72) Inventors: Johann Zipperer, Unterschleissheim (DE); Roger Neumair, Unterschleissheim (DE); Peter Weber, Allershausen (DE); Jace Hunter Hall, Carrollton, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/854,636

(22) Filed: Jun. 30, 2022

(51) Int. Cl.
*H04B 3/56* (2006.01)

(52) U.S. Cl.
CPC ..................................... *H04B 3/56* (2013.01)

(58) Field of Classification Search
CPC ....................................................... H04B 3/56
See application file for complete search history.

(56) References Cited

U.S. PATENT DOCUMENTS

| 5,305,174 A * | 4/1994 | Morita .................... H02H 3/025 361/63 |
| 6,657,843 B1 * | 12/2003 | Girard .................... H02H 9/042 361/111 |
| 2003/0197426 A1 * | 10/2003 | Carson ..................... H04B 3/54 340/12.32 |

* cited by examiner

*Primary Examiner* — Sung S Ahn
(74) *Attorney, Agent, or Firm* — Krista Y. Chan; Frank D. Cimino

(57) ABSTRACT

A transmission system includes a first device and a second device remote from the first device. The first device transmits electrical energy to a transmission line during a power provision phase, generates and transmits data symbols to the transmission line during a downstream transmission phase, and receives data symbols from the transmission line during an upstream transmission phase. The second device receives the energy from the transmission line during the power provision phase, receives the data symbols from the transmission line during the downstream transmission phase, and generates and transmits the data symbols to the transmission line during the upstream transmission phase, and the second device generates and transmits data symbols by shorting or disconnecting the transmission line. A method of transmitting electrical energy from the local device to the remote device, and communicating data symbols between the local and remote devices is also disclosed.

18 Claims, 7 Drawing Sheets

BASEBAND REFLECTION MODULATION ON POWER LINES

BACKGROUND

The present disclosure relates, generally, to systems, methods, and devices for communicating over power lines, including main power lines. There is a need in the art for a system in which a local device can effectively transmit electrical power and data through one or more power lines to one or more remote devices such as household and business lighting units, appliances (including smart home devices), and other equipment. There is also a need in the art for a system in which one or more of the remote devices can return data to the local device through the power lines.

SUMMARY

The present disclosure relates to a transmission system which includes a first device and a second device remote from the first device. According to one aspect of the present disclosure, the first device transmits electrical energy to a transmission line during a power provision phase, generates and transmits data symbols to the transmission line during a downstream transmission phase, and receives data symbols from the transmission line during an upstream transmission phase. According to another aspect of the present disclosure, the second device receives the electrical energy from the transmission line during the power provision phase, receives the first data symbols from the transmission line during the downstream transmission phase, and generates and transmits the second data symbols to the transmission line during the upstream transmission phase, and the second device generates and transmits data symbols by shorting or disconnecting the transmission line.

The present disclosure also relates to a transmission system which includes a first device, a second device remote from the first device, and a transmission line between the first and second devices, where the first device transmits electrical energy to the transmission line during a power provision phase, generates and transmits data symbols to the transmission line during a downstream transmission phase, and receives data symbols from the transmission line during an upstream transmission phase. In operation, the second device receives the electrical energy from the transmission line during the power provision phase, receives the first data symbols from the transmission line during the downstream transmission phase, and generates and transmits the second data symbols to the transmission line during the upstream transmission phase.

The present disclosure also relates to a method of transmitting electrical energy from a local device to a remote device, and communicating data symbols between the local device and the remote device.

BRIEF DESCRIPTION OF THE DRAWINGS

The same reference numbers, letters, and other feature designators are used in the figures to designate the same or similar features.

DETAILED DESCRIPTION

Figure 1:
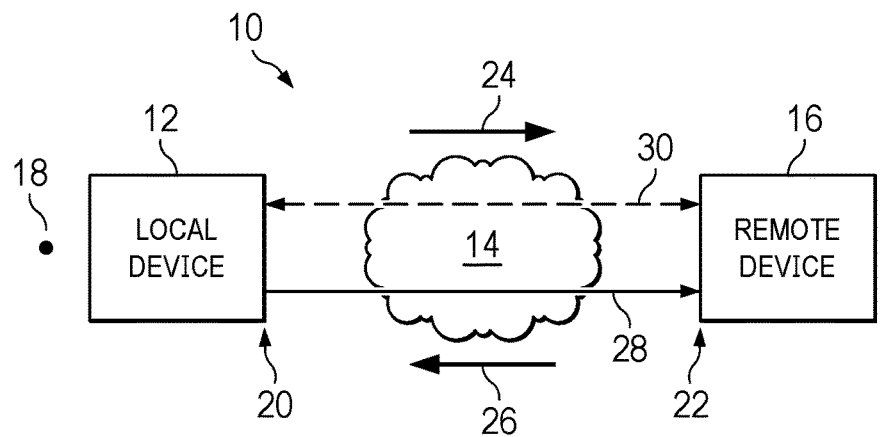
FIG. 1 is a schematic illustration of an example of a transmission system constructed in accordance with the present disclosure.

FIG. 1 is a schematic illustration of an example of a transmission system 10 constructed in accordance with the present disclosure. The transmission system 10 includes a local device 12 (an example of a first device), a transmission line 14, and one or more remote devices 16 (examples of one or more second devices). The side of the system 10 from which the system 10 is seen by a viewer (that is, the side of the local device 12 in the illustrated system 10) is the system viewpoint 18. The local device 12 is located on the side of the viewer (that is, at a near end 20 of the transmission system 10). The one or more remote devices 16 are operatively connected to the transmission line 14 at a far end 22 of the transmission system 10.

In the illustrated configuration, the local device 12 is electrically powered and provides electrical power to the transmission line 14, while the one or more remote devices 16 are remotely powered at least in part by the transmission line 14. For example, the local device 12 may be powered by a domestic power grid (e.g., "wall power"), and the remote device(s) 16 may be powered by the local device 12 via the transmission line 14. In some examples, the remote device(s) 16 may utilize supplemental power from a battery, energy harvesting, etc. In contrast to other communication systems, the system 10 described by way of example herein does not use the more limited energy from remote-powered devices, but instead uses the more readily available energy from the local device 12 to modulate symbols on the transmission line 14.

The transmission line 14 may include one or more electrical wires, cables, and other devices, such as connectors, transformers, and delay elements, for transferring electrical energy and data between the local device 12 and the one or more remote devices 16. The delay elements of the transmission line 14 may include, for example, dielectric bricks, inductive polymers, and other devices and materials.

In operation, electrical energy and data flow through the transmission line 14 in a downstream direction 24, from the near end 20 of the system 10 to the far end 22 of the system 10, that is, from the local device 12 to the one or more remote devices 16. In addition, data flows though the transmission line 14 in an upstream direction 26, from the far end 22 of the system 10 to the near end 20 of the system 10, that is, from the one or more remote devices 16 to the local device 12.

The flow of electrical energy through the transmission line 14, which is primarily in the downstream direction 24, is schematically illustrated in FIG. 1 by a solid arrow 28. The flow of data through the transmission line 14, which occurs in both the downstream direction 24 and the upstream direction 26, is schematically illustrated in FIG. 1 by a broken line 30. The system 10 operates within a baseband, which is the transferred signal spectrum, from zero to a maximum bandwidth or a highest signal frequency.

Figure 2:
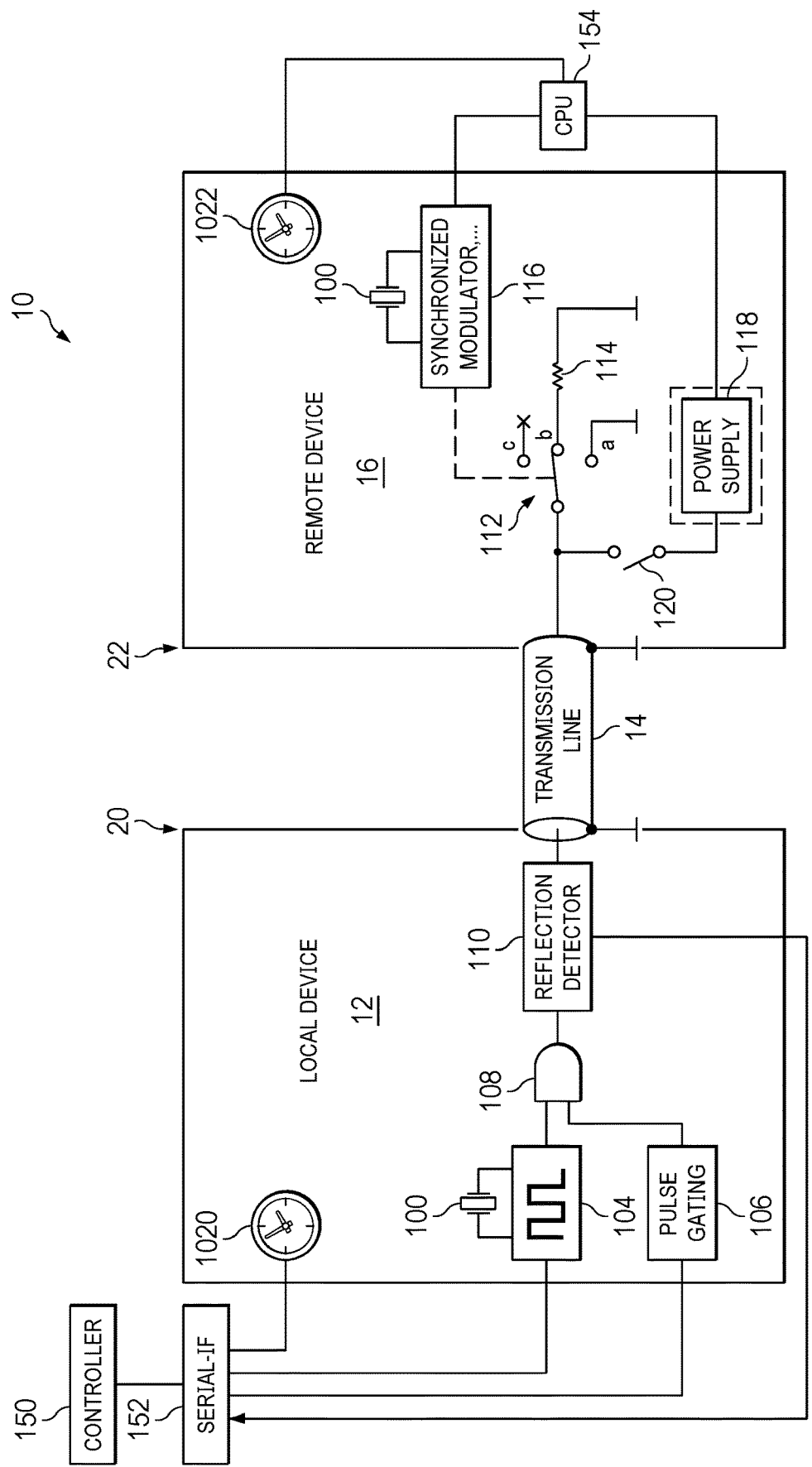
FIG. 2 is another schematic illustration of the transmission system illustrated in FIG. 1.

FIG. 2 is another schematic illustration of the transmission system 10. As shown in FIG. 2, the local device 12 is operatively connected to the transmission line 14 at the near end 20 of the transmission system 10, while the one or more remote devices 16 are operatively connected to the transmission line 14 at the far end 22 of the system 10. The local device 12 and the one or more remote devices 16 each have suitable timing-generating devices 100 for generating a suitable timing with sufficient accuracy. The timing-generating devices 100 may include, if desired, one or more crystal oscillators. In addition, the local device 12 and the one or more remote devices 16 may have protocol timers 1020, 1022 for splitting the available time into power provision phases, downstream transmission phases, and upstream transmission phases.

The protocol timer 1020 of the local device 12 may be operatively connected to, controlled by, and provide timing information to, a controller 150, through a suitable interface 152. Each protocol timer 1022 of the one or more remote devices 16 may be operatively connected to, controlled by, and provide timing information to, a suitable respective processor (CPU) 154.

During the power provision phases, electrical power is transmitted through the transmission line 14 in the downstream direction 24, but data may not be communicated through the transmission line 14. During the downstream transmission phases, data from the local device 12 may be communicated in the downstream direction 24 through the transmission line 14 to the one or more remote devices 16. During the upstream transmission phases, data from the one or more remote devices 16 may be communicated in the upstream direction 26 through the transmission line 14 to the local device 12.

The local device 12 includes a waveform generator 104 which may be, for example, a switched-mode power supply (SMPS). In some examples, the waveform generator 104 produces an alternating current voltage at a power mains frequency (e.g., 50 Hz or 60 Hz). The downstream data for the downstream transmission phases may be created by gating the AC voltage generated by the generator 104 using an AND function. In the illustrated configuration, an output of the generator 104 and an output of a pulse gating device 106 are connected to inputs of a suitable logic gate such as an AND gate 108. Whenever a signal from the pulse gating device 106 is low (not on), a notch is created in the waveform that would otherwise be generated by the generator 104, and the notch is propagated through the transmission line 14 in the downstream direction 24. The waveform generator 104 and the pulse gating device 106 may be operatively connected to, and controlled by, the controller 150, through the interface 152.

The widths and timings of the notches in the waveform on the transmission line 14 define the downstream data traffic transmitted in the downstream direction 24 through the transmission line 14 during the downstream transmission phases. In the illustrated system 10, the downstream data traffic to be transmitted to the one or more remote devices 16 is created by the waveform generator 104 and the pulse gating device 106, operating under the control of the controller 150. The present disclosure should not be limited, however, to the details shown in the drawings. For example, the output of the pulse gating device 106 may be applied, if desired, to an inverting input of an AND gate, such that whenever the signal from the pulse gating device 106 is high (on), a notch is created in the waveform that would otherwise be generated by the generator 104.

The output of the AND gate 108 passes through a reflection detector 110 and is transmitted in the downstream direction 24 on the transmission line 14 to the one or more remote devices 16. As a result, a pulse pattern is received by the one or more remote devices 16 at the far end 22 of the system 10. The pulse pattern represents the data flowing in the downstream direction 24. During such downstream data transmission, the transmission line 14 is terminated by connecting a switch terminal 112 to a terminal b of a resistor 114.

Figure 5:
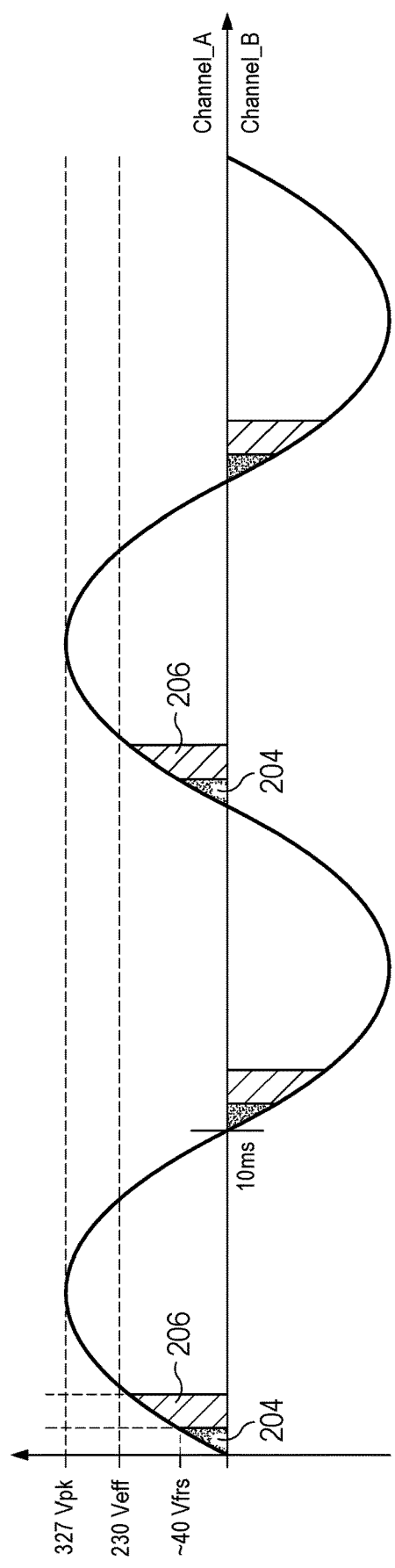
FIG. 5 is another representation of the waveform represented in FIG. 4.

Reflections of signals on conducting lines, like the transmission line 14, typically exhibit a phase change from the incident signal. There are two extreme cases of termination either of which can be exploited according to the present disclosure: short circuit (closed line), and open circuit (broken line). In both cases the full amplitude of the wave is reflected. The voltage wave reflection on a line terminated with a short circuit is 180° phase shifted (from Channel_A to Channel_B as shown in FIG. 5). The current wave, on the other hand, is not phase shifted. A transmission line terminated with an open circuit is the dual case; the voltage wave is shifted by 0° and the current wave is shifted by 180°.

During an upstream transmission phase, the one or more remote devices 16 provide a series of pulses (notches in the reflected waveform) representing the desired upstream data pattern, by either selectively shorting out or selectively disconnecting the transmission line 14, under the control of a synchronized modulator 116. The pulses may be detected as binary digits (bits) at the near end 20 of the system 10 by the reflection detector 110. When the upstream data pattern is created by shorting out the transmission line 14 (using a first terminal a of the switch terminal 112, as discussed in more detail below), the pulses may have a reflection coefficient Γ of −1. When the upstream data pattern is created by open circuiting the transmission line 14 (using another terminal c of the switch terminal 112, as discussed in more detail below), the pulses may have a reflection coefficient Γ of +1. In either event, the pulses may be detected by the reflection detector 110 which causes corresponding information to be forwarded to the interface 152. The reflection detector 110 may be formed of suitable circuit elements located between the transmission line 14 and the logic gate 108. The reflection detector 110 may be operatively connected to, controlled by, and provide reflection information to, the controller 150, through the interface 152.

The energy for operating the one or more remote devices 16 may be received from the transmission line 14. The synchronized modulator 116 may be operatively connected to, controlled by, and provide synchronization information to, the processor 154.

Shorting of the transmission line 14 may be performed by connecting the switch terminal 112 to a neutral terminal a. Disconnecting the transmission line 14 may be performed by connecting the switch terminal 112 to an open terminal c. Upstream data traffic is detected by the reflection detector 110. As noted above, however, the present disclosure should not be limited to the details of what is shown in the drawings. For example, suitable switching devices may be used instead of the switch terminal 112 to connect the transmission line 14 to one of the three terminals a, b, c. If desired, switching to only one of the neutral terminal a and the open terminal c may be used to generate the desired reflection signals.

During a power provision phase, the timing of the local device 12 is provided by the protocol timer 1020 of the local device 12, while one or more power supplies 118 for the one or more remote devices 16 consume(s) the power. In operation, one or more corresponding second switch terminals 120 are closed to connect the transmission line 14 to the one or more power supplies 118 for the one or more remote devices 16. Each power supply 118 may be operatively connected to, and controlled by, the respective processor 154.

Figure 3:
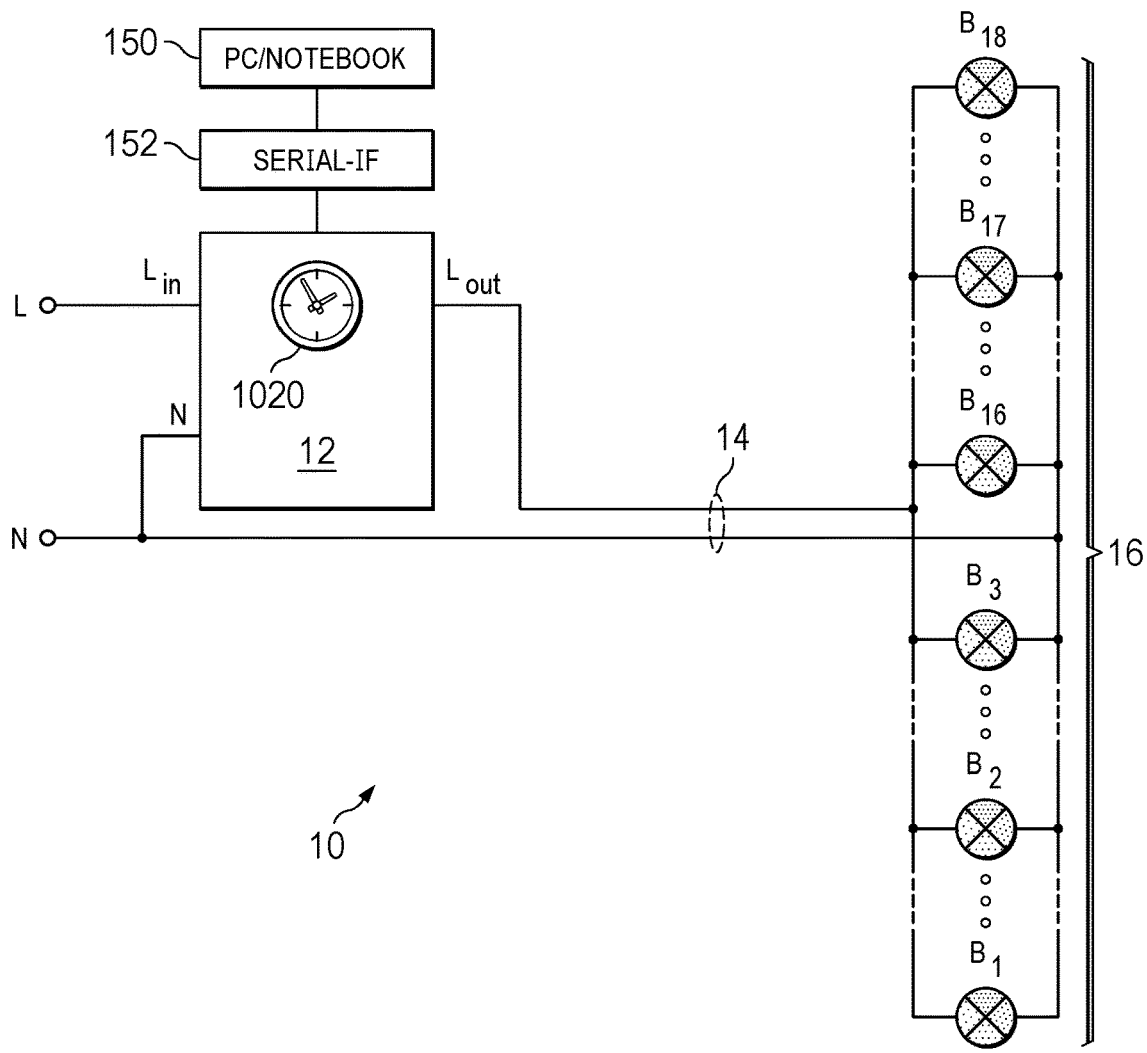
FIG. 3 is another schematic illustration of the transmission system illustrated in FIG. 1, where the system includes multiple remote devices.

FIG. 3 is another schematic illustration of the example transmission system 10, where the at least one remote device 16 includes a large number of remote devices $B_1$, $B_2$, $B_3$, $B_{16}$, $B_{17}$, $B_{18}$. The number of remote devices employed in the system 10 may be 1, more than 1, 6, more than 6, 18, or more than 18. The illustrated remote devices $B_1$, $B_2$, $B_3$, $B_{16}$, $B_{17}$, $B_{18}$ may be, for example, one or more lamps, fans, shutters, switchable outlets, and data nodes. Thus, the system 10 may be implemented to operate smart home appliances, or to operate low rate datacom elements.

Figure 11:
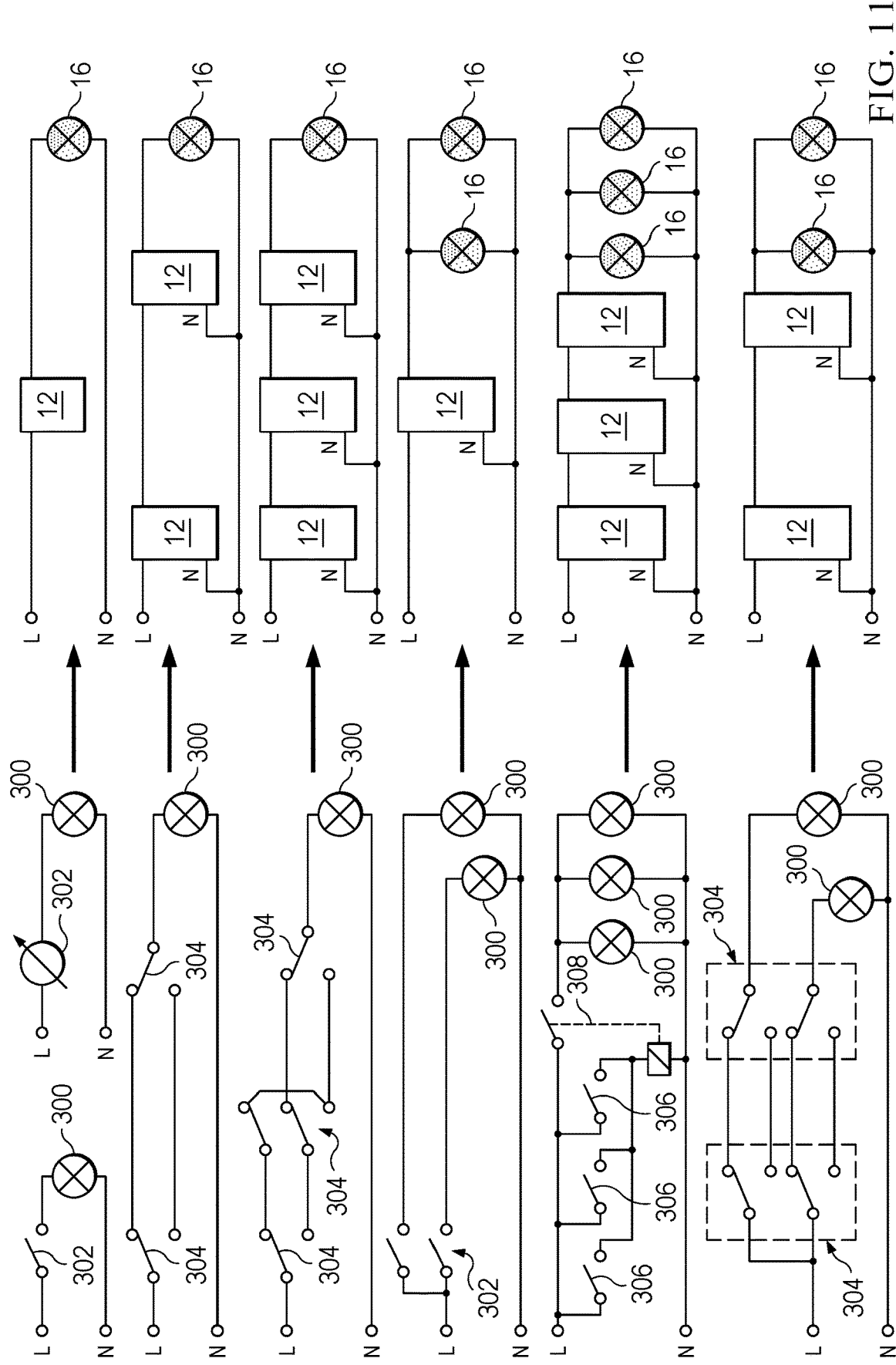
FIG. 11 shows schematic diagrams of household and business lighting circuits and corresponding reconfigured circuits with local and remote devices constructed in accordance with the present disclosure.

According to one aspect of the present disclosure, the local device 12 operates as a head station, and may include multiple, series-connected stations (illustrated in FIG. 11 but not illustrated in FIG. 3). One of the stations may be a session master device which includes, for example, a primary switch router or a gateway, and another one of the stations may include a secondary switch and operate as a backup master. Each remote device $B_1$, $B_2$, $B_3$, $B_{16}$, $B_{17}$, $B_{18}$ may be connected, in parallel, to the transmission line 14, such that the remote devices $B_1$, $B_2$, $B_3$, $B_{16}$, $B_{17}$, $B_{18}$ form multiple nodes at the far end 22 of the system 10.

If desired, the transmission line 14 may be branched or segmented in the sense that the transmission line 14 connects each one of the remote devices $B_1$, $B_2$, $B_3$, $B_{16}$, $B_{17}$, $B_{18}$ to the local device 12. In the illustrated example, suitable timing (frequency) may be provided by the local high-accuracy generators 100 (FIG. 2), which may include a digitally controlled oscillator (DCO) or a crystal oscillator (XTAL). Timing (synchronization) directed by the protocol timers 1020, 1022 may be recovered from the zero crossings of "warm wire/hot wire" conditions on the transmission line 14 (as explained in more detail below).

In the configuration illustrated in FIG. 3, the transmission line 14 includes resistive power line wires L and neutral wires N. The neutral wires N bring the illustrated circuit to a ground or a busbar which may be connected, for example, at an electrical panel (not illustrated). An input portion $L_{in}$ of the line wires L may be connected to power-line connections of electrically powered elements of the local device 12, including the waveform generator 104. An output portion $L_{out}$ of the line wires L may be used to connect the reflection detector 110 to the one or more remote devices 16 through the transmission line 14. The neutral wires N may be connected to neutral connections of the electrically powered elements 1020, 104, 106, 110 (FIG. 2) of the local device 12.

Data modulation may be achieved in the one or more remote devices 16 by shorting one of the line wires L (FIG. 3) to one of the neutral wires N using the neutral terminals a (FIG. 2) in the remote devices 16 ($B_1$, $B_2$, $B_3$, $B_{16}$, $B_{17}$, $B_{18}$). The symbol coding itself may be based on designated timing provided by the synchronized modulator 116 to supply the short (terminal a) and timing to release the short (terminal b).

If desired, the controller 150 may be a suitable multi-purpose computer (PC/notebook) or dedicated processor. The controller 150 may be used to configure the local device 12, and to store symbols from a training sequence (described in more detail below). The interface 152 which connects the controller/computer/processor 150 to the local device 12 may be a suitable serial interface (IF) 152.

Each remote device $B_1$, $B_2$, $B_3$, $B_{16}$, $B_{17}$, $B_{18}$ may have its own particular enumeration by using, for example, suitable dual in-line package (DIP) switches or a suitable smart protocol. Such enumeration may be used, for example, so that the controller 150 can separately identify the respective devices (nodes) $B_1$, $B_2$, $B_3$, $B_{16}$, $B_{17}$, $B_{18}$.

Figure 4:
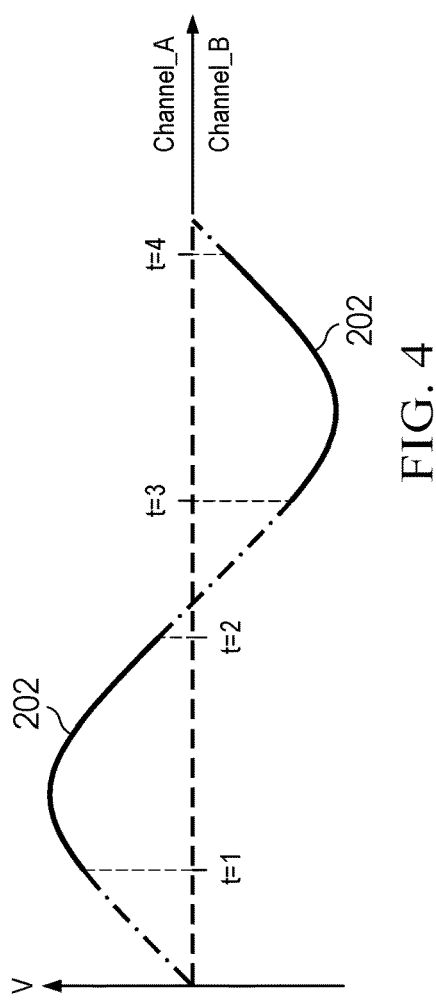
FIG. 4 is a generalized representation of a waveform of electrical energy transmitted in the transmission system illustrated in FIG. 1.

Referring now to FIG. 4, the overall timing of the system 10 is determined by the power line (mains) frequency which may be, for example, 50 Hz or 60 Hz. The shorting which establishes the upstream data traffic may be timed to occur near the zero crossing(s) of the AC power cycle where the resistive line wire L transitions from being a "hot wire" to only a "warm wire." FIG. 4 shows the voltage 202 on the line wire L. The line wire L is considered a "warm wire," with a relatively low voltage, before time t=1, between times t=2 and 3, and after time t=4. The line wire L is considered a "warm wire," with low (or zero) voltage, twice in each cycle of the waveform. The line wire L is considered a "hot wire," with a relatively high voltage, between times t=1 and 2, and between times t=3 and 4.

Channel_A contains positive voltages, and data notches within those positive voltages, on the line wire L. Within Channel_A, voltage V on the line wire L rises through time t=1 and falls through time t=2 except that the voltage V is zero during downstream data notches created by the local device 12. Channel_B contains negative voltages, and data notches within those negative voltages, on the line wire L. Within Channel_B, voltage V on the line wire L falls through time t=3 and rises through time t=4), except that the voltage V is zero during upstream data notches created by the remote device(s) 16. In some examples, since the upstream data notches are formed only in Channel_B, they do not interfere with the downstream data notches which are formed only in Channel_A.

In the illustrated system, the power provision phase occurs, and switches 120 are closed, while the line wire L is considered a hot wire (with relatively high voltage), the downstream transmission phase is realized on Channel_A when the line wire L is considered a warm wire (with relatively low voltage), and the upstream transmission phase is realized on Channel_B when the line wire L is considered a warm wire (with relatively low voltage). A first portion 204 (FIG. 5) of each cycle on Channel_A (in the warm wire section) may be reserved for a downstream strobe. A second portion 206 of each cycle on Channel_A (in the warm wire section) may be reserved for training and downstream data.

In the FIG. 5 example, the power line (mains) operates at 50 Hz, and there is a timeframe of about 1 ms to communicate with a low noise floor on a line segment with relatively high impedance (2 ms max are possible with some effort). Outside that 1-2 ms timeframe, the typical DC/DC converter (for an SMPS) generates noise, such as capacitive recharge currents, and other loads, which distorts signals on the line wire L. To use this small time gap requires precise clock switching (SW) alignment between the local device 12 and the remote devices (nodes) $B_1$, $B_2$, $B_3$, $B_{16}$, $B_{17}$, $B_{18}$.

In the illustrated example, in the downstream direction 24, data notches on Channel_A are created by the AND gate 108 connected to the pulse gating device 106 and the waveform generator 104. In the upstream direction 26, data notches on Channel_B are created by shorting the line wire L (when it is considered a warm wire) to the neutral wire N, for example, by connecting the switch terminal 112 (FIG. 2) to the neutral terminal a. In the illustrated embodiment, there may be 16 different notches for each period of the waveform, with each notch distinguished from the other by width (time). Thus, in the illustrated configuration, 4 bits of information may be transmitted per half wave (400 Bd @ 50 Hz mains).

Figure 6:
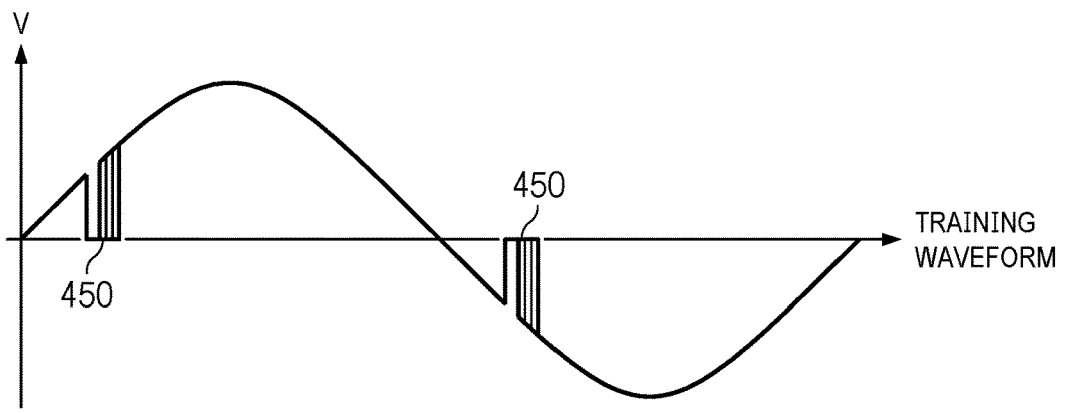
FIGS. 6, 7, and 8 illustrate a training waveform, a data waveform, and an acknowledge waveform, respectively, for electrical energy transmitted in the transmission system illustrated in FIG. 1.
Figure 7:
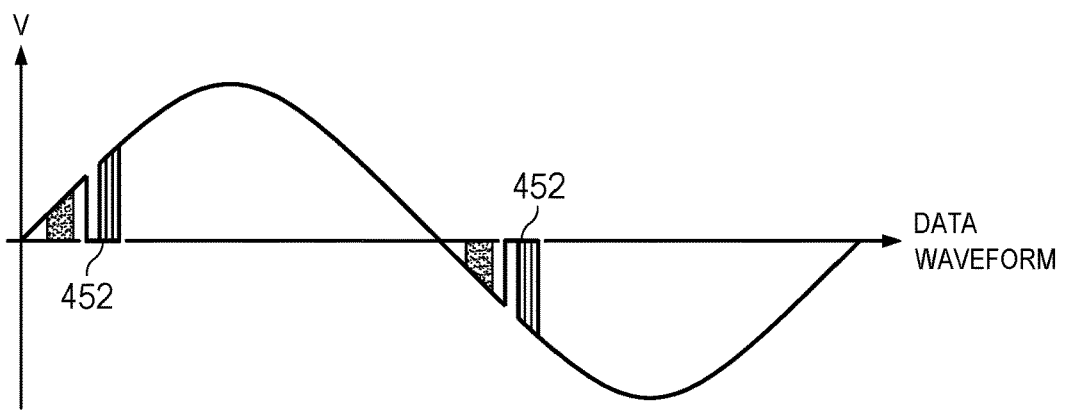
Figure 8:
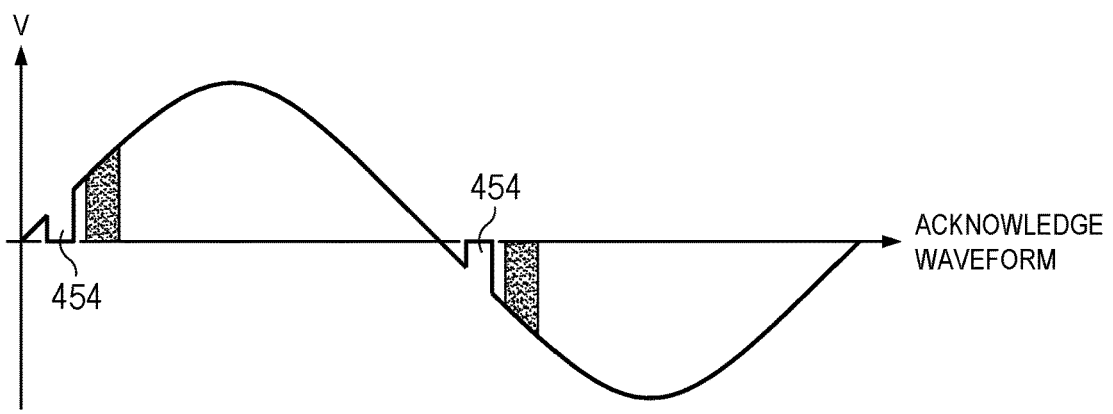

FIGS. 6, 7, and 8 show a training waveform, a data waveform, and an acknowledge waveform, respectively, and data symbols on the power line L are represented by notches in what would otherwise be the waveforms. In the training waveform, 16 different notches 450 of different durations provide 4 bits, on each of Channel_A and Channel_B. In the data waveform (FIG. 7), the true shape of downstream-transmitted symbols in region 452 depends on a position; therefore, training symbols 450 are used as a reference. The notches 450 in the training waveform may be generated always with the same relative locations, sequence, and durations. As explained in more detail below, the device which receives the training waveform stores this information (for example, in symbol timing tables) and uses it to interpret the subsequently received data symbols (transmitted in regions 452).

Due to different load conditions, imbalances of the transmission line/bus, spread of components, and other imperfections, a fixed timing for all of the remote devices (nodes) $B_1$, $B_2$, $B_3$, $B_{16}$, $B_{17}$, $B_{18}$ is difficult or impossible to obtain. Such imbalances and imperfections can be overcome, however, by providing continuous training sequences. In the illustrated example, training symbols are used as references to build up a symbol timing table, and each remote device (node) $B_1$, $B_2$, $B_3$, $B_{16}$, $B_{17}$, $B_{18}$ develops its own local unique timing values. After a power loss, the table of timing values may have to be generated again before communication can resume.

The timing for acknowledgement traffic, in contrast to the timing for training and data traffic, may be much more relaxed. Thus, in the acknowledge waveform (FIG. 8), notches 454 for acknowledgements and upstream events may be longer than the symbol notches 452 and may have much more relaxed timing. In the illustrated configuration, the upstream data rate may be 25-50 Bd @ 50 Hz.

Figure 9:
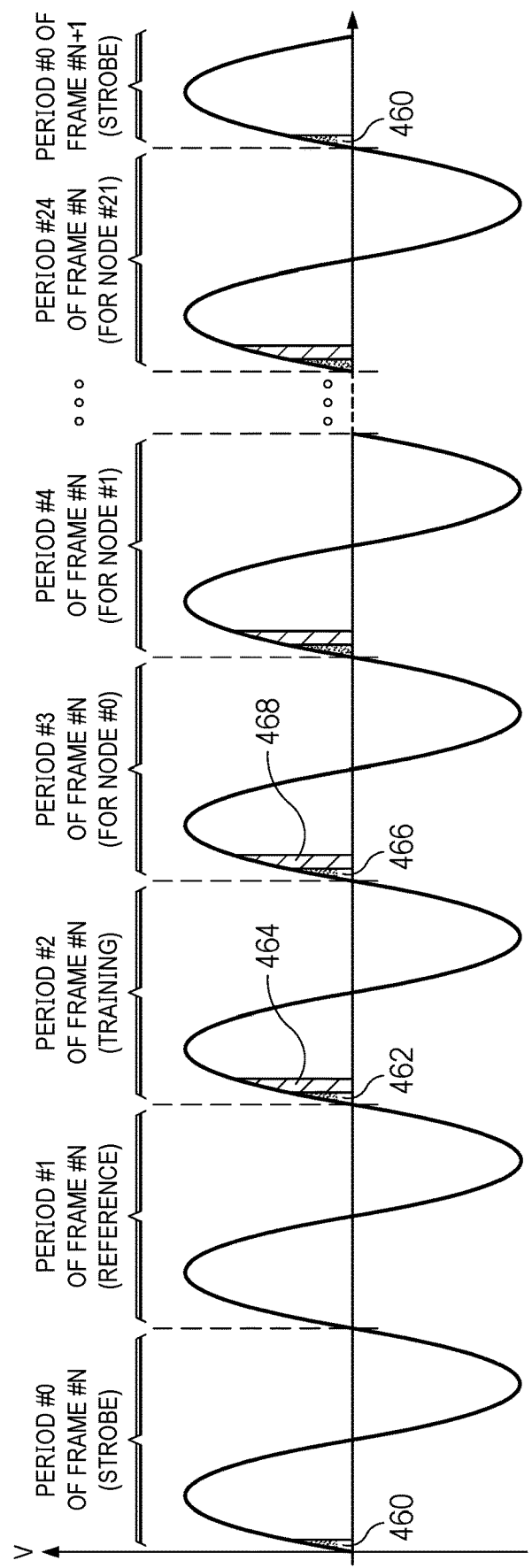
FIG. 9 illustrates a waveform for electrical energy transmitted in the transmission system illustrated in FIG. 1, where successive periods of the waveform correspond to different remote devices.

As illustrated in FIG. 9, a large frame may be used to organize the downstream data traffic when there are many remote devices 16. Adding continuous training periods with incrementing symbols allows the remote devices (nodes) to compare data-symbols with the reference-symbols at their exact locations, as a matter of dynamic line equalization. Memory (RAM) size limits allow only to compensate between the local device and the remote devices (nodes). Upstream time slots are fixed (assigned).

Downstream data traffic in the waveform shown in FIG. 9 may include the following: A strobe 460 indicating the start of a frame (Frame #N) may appear at the beginning of Period #0. The strobe 460 can be used by the remote devices 16 to expect that a new frame (Frame #N) is being transmitted. No strobe is indicated at the beginning 462 of (training) Period #2. The absence of a strobe at the beginning 462 of Period #2 can be used by the remote devices 16 to expect that an incrementing pattern 464 of training symbols will follow in Period #2. In the illustrated example, the training symbols include 16 symbols (notches), in the incrementing pattern 464, and the training symbols are provided shortly after the beginning of Period #2.

After the training symbols have been provided to the remote devices 16 (in Period #2), subsequent periods (Periods #3, #4, #5 . . . #24) of the frame are received by the remote devices 16. In the illustrated example, twenty-two of the remote devices 16 are connected to the transmission line 14. All of the remote devices 16 receive the training symbols contained in Period #2 and downstream data contained in the following Periods #3-#24. As noted above, each remote device 16 may have its own particular enumeration. Therefore, each device 16 may discern which period contains the downstream data for that device 16. Such discernment may be achieved by counting notches of equal length 466 where each notch represents the start of a successive period, or by the detecting the lengths of unequal-length notches 466 where the remote devices 16 are assigned to notches of different lengths, or by some other suitable process.

Thus, in FIG. 9, a notch 466 representing upstream bit node #0 (one of the twenty-two remote devices 16 operated in this example) appears at the beginning of Period #3 (after the strobe, reference, and training periods), followed by notches 468 for downstream broadcast data for the first remote device (node #0). The first remote device (node #0) can compare the downstream data notches 468 to stored data based on the training notches 464 to interpret the downstream data intended for the first remote device (node #0). Another notch representing upstream bit node #1 (a second one of the twenty-two remote devices 16) appears at the beginning of Period #4 (after the strobe, reference, training, and first downstream data periods), followed by notches for downstream broadcast data for the second remote device (node #1). The second remote device (node #1) can compare the downstream data notches of Period #4 to the data stored therein based on the training notches 464 to interpret the downstream data intended for the second remote device (node #1).

The strobe 460, the training notches 464, and the data notches 468 are all within warm wire sections of the illustrated waveform. After periods have been transmitted for all of the twenty-two nodes, the successive period #0 begins with another notch 460 indicating that a new frame (Frame #N+1) is starting.

Figure 10:
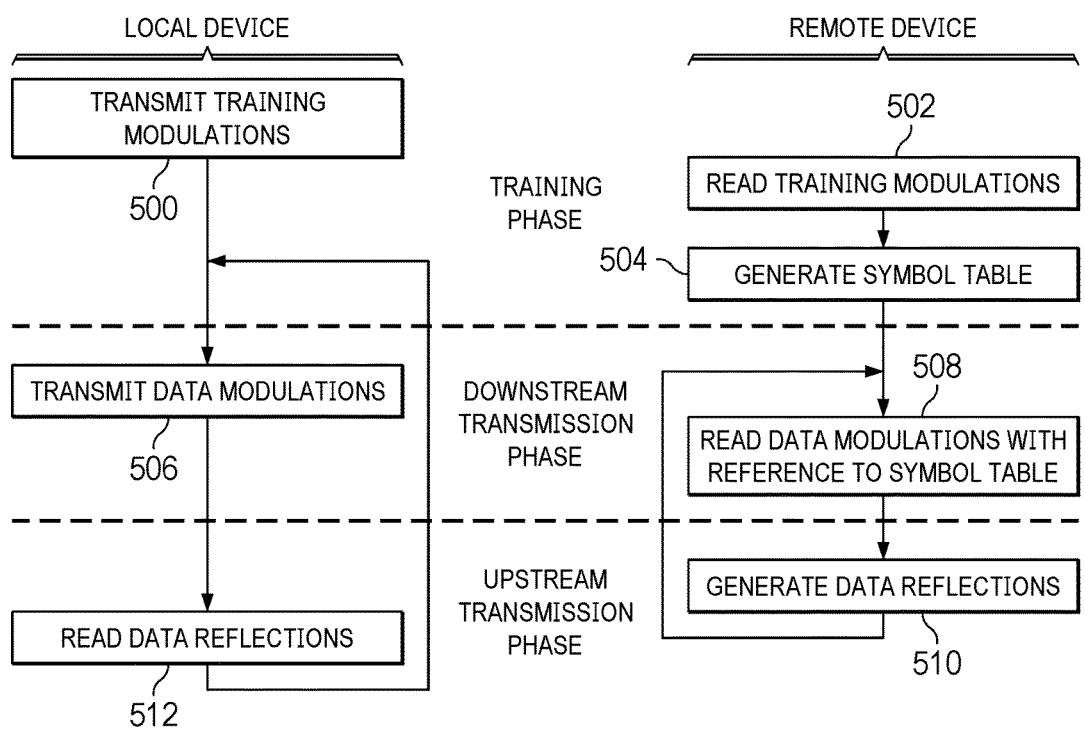
FIG. 10 shows flowcharts for methods of operating the local and one or more remote devices of the transmission system illustrated in FIG. 1.

Methods of operating the local device 12 and the one or more remote devices 16 are illustrated, by way of example, in FIG. 10. During a training phase, the pulse gating device 106 of the local device 12, operating through the AND gate 108, creates notch-like training modulations in a warm wire section of a waveform generated by the waveform generator 104 (Step 500). The notch-like modulations may form the incrementing pattern 464 shown in FIG. 9, and may represent a predetermined sequence of, for example, sixteen different values. The training modulations are propagated on the transmission line 14 in the downstream direction.

Subsequently, the one or more remote devices 16 read the training modulations in a warm wire section of the waveform (Step 502). The operations of the local device 12 and the one or more remote devices 16 are synchronized to the waveform by sensing zero-crossing points of the waveform. The shapes of the training modulations sensed by the one or more remote devices 16 are stored by the one or more local devices 16 in one or more respective symbol tables, where the shapes of the modulations are correlated to the predetermined sequence of values (Step 504).

Subsequently, during a downstream transmission phase, the gating device 106 of the local device 12, operating through the AND gate 108, creates notch-like data modulations 468 in a warm wire section of a waveform generated by the waveform generator 104 (Step 506). The shapes of the data modulations represent data intended to be transmitted to the one or more remote devices 16. Then, the one or more remote devices 16 read the data intended to be transmitted from the data modulations in the warm wire section of the waveform, with reference to the correlations stored in the symbol table (Step 508). The one or more remote devices 16 may respond to the read data by taking one or more desired actions, such as turning on a light, lowering a thermostat, etc.

Subsequently, during an upstream transmission phase, the one or more local devices 16 operate one or more respective switches 112 to generate data reflections in a warm wire section of the waveform (Step 510). The reflections may represent information desired to be transmitted to the local device 12, such as an acknowledgement, a status indicator, a thermometer reading, etc. The data reflections are detected by the reflection detector 110 and uncoded by the controller 150 (Step 512), such that the desired information can be processed by the local device 12. The local device 12 and the one or more remote devices 16 then repeat the downstream and upstream transmission phases.

FIG. 11 illustrates methods for reconfiguring common household and business lighting configurations. The left side of the drawing (to the left of the arrowheads) shows circuits which have one or more lamps 300 connected in series between power line wires L and corresponding neutral lines N, and configured to be controlled by conventional switches 302, toggles 304, and push buttons 306 for operating an on/off relay 308. The right side of the drawing shows corresponding circuits with the lamps 300 replaced by suitable remote devices 16 for providing corresponding illumination, and with the switches 302, toggles 304, and push buttons 306 for operating an on/off relay 308 of the respective circuits replaced by suitable local devices (including series-connected local devices for some of the circuits) 12. The local devices 12 may be operated with suitable software or firmware. As illustrated in FIG. 11, in many cases, not all wiring resources of the original circuits are required to implement the reconfigured circuits.

In operation, the local devices 12 and the remote devices $B_1$, $B_2$, $B_3$, $B_{16}$, $B_{17}$, $B_{18}$ resynchronize themselves by recognizing the zero crossing and by counting the OSC periods. As a result, the system 10 may work well with a digitally controlled oscillator (DCO), and a crystal oscillator (XTAL) may not be required.

The present disclosure provides important advantages over systems for communicating over main power lines which use a significant portion of the energy that is intended to be transferred in order to modulate symbols. Associated hardware in such other systems can be disadvantageously large and relatively expensive, regardless of the bandwidth of communication. Some systems have addressed these problems by providing a larger power supply and employing larger modulator components. Low-frequency-band analog radio-frequency (RF) solutions have also been suggested; however, such systems may be relatively expensive as well, and they are not necessarily tamper proof. RF solutions which operate in the industrial, scientific, and medical (ISM) frequency band have also been suggested, but such systems disadvantageously occupy RF bandwidth and may still be relatively expensive.

According to one aspect of the present disclosure, a communication system may include a head unit (a near end, or node) of the system, a transmission line 14 connected to the head unit, and a modulation unit. The head unit and modulation unit of such a communication system are examples of a local device 12 and a remote device 16 within the meaning of the present disclosure. In operation, the head unit provides modal/temporal conditions to allow safe "shorts cut" or "open line" conditions on the transmission line. The modulation elements, on the other hand, operate by shorting the line and/or opening the line, and thereby create detectable symbols on the transmission line for reception at one or more remote ends, or nodes, of the transmission line.

According to one aspect of the present disclosure, a baseband modulation method involving reflection modulation may be used to provide low bandwidth communication, with a baud rate (Bd) in a range, for example, of 400 to 800 Bd. This range may be sufficient for most building automation applications and for other purposes. It should be understood, however, that the present disclosure should not limited to numerical values and other details described herein, except to the extent defined in the accompanying claims. Thus, a baud rate of 400 to 800 Bd is not intended to be limiting herein, except if recited in the claims, but is suggested for use in connection with one or more examples described herein.

The present disclosure, as described herein in connection with examples, may be relatively uncomplicated, relatively low cost, and cable bound. The present disclosure may be used, for example, in connection with direct replacement of existing resources for building automation. Using a simple timer-controlled switch 112 as a modulator, the illustrated system 10 can reduce energy-usage, and the cost associated with making and operating the system can be reduced to a great extent.

A system constructed in accordance with the present disclosure may be used to provide communication to and from a microcontroller unit (MCU) 154, which may be, for example, an intelligent semiconductor integrated circuit (IC) that includes a processor unit, memory modules, communication interfaces and peripherals. Such MCUs 154 may be used across a broad range of applications, including washing machines, robots, drones, radio, and game controllers.

What have been described above are examples. This disclosure is intended to embrace alterations, modifications, and variations to the subject matter described herein that fall within the scope of this application, including the appended claims. As used herein, the term "includes" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed as new and desired to be protected by Letters Patent of the United States is:

1. A transmission system comprising:
    a first device configured to transmit electrical energy to a transmission line during a power provision phase, generate and transmit first data symbols to the transmission line during a downstream transmission phase, and receive second data symbols from the transmission line during an upstream transmission phase; and
    a second device, configured to be remote from the first device, receive the electrical energy from the transmission line during the power provision phase, receive the first data symbols from the transmission line during the downstream transmission phase, and generate and transmit the second data symbols to the transmission line during the upstream transmission phase, and wherein the second device is configured to generate and transmit the second data symbols by shorting or disconnecting the transmission line during the upstream transmission phase.

2. The transmission system of claim 1, wherein the first device includes a power supply for establishing a first waveform for the electrical energy, and a pulse gating device for establishing the first data symbols as notches within the first waveform.

3. The transmission system of claim 2, wherein the second device includes a modulator synchronized with the first waveform, and wherein the second device is configured to short or disconnect the transmission line under the control of the modulator.

4. The transmission system of claim 3, wherein the first device includes a reflection detector for detecting the second data symbols.

5. The transmission system of claim 4, further comprising additional devices, connected in parallel to the second device, and configured to receive the electrical energy from the transmission line during the power provision phase, receive the first data symbols from the transmission line during the downstream transmission phase, and generate and transmit additional data symbols to the transmission line during the upstream transmission phase, and wherein the additional devices are configured to generate and transmit the additional data symbols by shorting or disconnecting the transmission line.

6. A first device for operating one or more second devices, wherein the first device is configured to transmit electrical energy to a transmission line during a power provision phase, the first device comprising:
a power supply for establishing a waveform of the electrical energy;
a pulse gating device for establishing first data symbols as notches within a low voltage portion of the waveform, and wherein the first device is configured to generate and transmit the first data symbols to the transmission line during a downstream transmission phase; and
a reflection detector for receiving second data symbols from the transmission line during an upstream transmission phase.

7. A second device configured to be operated by a first device according to first data symbols generated by the first device, wherein the second device is configured to receive electrical energy from a transmission line during a power provision phase, and to receive the first data symbols from the transmission line during a downstream transmission phase, the second device comprising:
a modulator configured to be synchronized with a waveform of the electrical energy; and
a switch connected to the modulator, the switch being configured to short or disconnect the transmission line during a low voltage portion of the waveform, under the control of the modulator, and thereby generate and transmit second data symbols to the transmission line during an upstream transmission phase.

8. An array comprising the second device of claim 7, and further comprising additional devices, connected in parallel to the second device, and configured to receive the electrical energy from the transmission line during the power provision phase, receive the first data symbols from the transmission line during the downstream transmission phase, and generate and transmit additional data symbols to the transmission line during the upstream transmission phase, and wherein the additional devices are configured to generate and transmit the additional data symbols by shorting or disconnecting the transmission line.

9. A transmission system comprising:
a transmission line;
a first device, connected to the transmission line, and configured to transmit electrical energy to the transmission line during a power provision phase, generate and transmit first data symbols to the transmission line during a downstream transmission phase, and receive second data symbols from the transmission line during an upstream transmission phase; and
a second device, connected to the transmission line, remote from the first device, and configured to receive the electrical energy from the transmission line during the power provision phase, receive the first data symbols from the transmission line during the downstream transmission phase, and generate and transmit the second data symbols to the transmission line during the upstream transmission phase, and wherein the second device is configured to generate and transmit the second data symbols by shorting or disconnecting the transmission line during the upstream transmission phase.

10. The transmission system of claim 9, wherein the first device includes a power supply for establishing a waveform for the electrical energy, and a pulse gating device for establishing the first data symbols as notches within the waveform.

11. The transmission system of claim 10, wherein the second device includes a modulator synchronized with the waveform, and wherein the second device is configured to short or disconnect the transmission line under the control of the modulator.

12. The transmission system of claim 11, wherein the first device includes a reflection detector for detecting the second data symbols.

13. The transmission system of claim 12, further comprising additional devices, connected in parallel to the second device, and configured to receive the electrical energy from the transmission line during the power provision phase, receive the first data symbols from the transmission line during the downstream transmission phase, and generate and transmit additional data symbols to the transmission line during the upstream transmission phase, and wherein the additional devices are configured to generate and transmit the additional data symbols by shorting or disconnecting the transmission line.

14. A method of transmitting electrical energy from a local device to a remote device, and communicating data symbols between the local device and the remote device, the method comprising:
using the local device to transmit the electrical energy to a transmission line during a power provision phase, generate and transmit first data symbols to the transmission line during a downstream transmission phase, and receive second data symbols from the transmission line during an upstream transmission phase; and
using the remote device to receive the electrical energy from the transmission line during the power provision phase, receive the first data symbols from the transmission line during the downstream transmission phase, and generate and transmit the second data symbols to the transmission line during the upstream transmission phase, and generating and transmitting the second data symbols by shorting or disconnecting the transmission line during the upstream transmission phase.

15. The method of claim 14, wherein using the local device to generate and transmit the first data symbols includes using a power supply to establish a waveform for the electrical energy and using a pulse gating device to establish the first data symbols as notches within the waveform.

16. The method of claim 15, wherein using the remote device to generate and transmit the second data symbols includes using a modulator synchronized with the waveform and shorting or disconnecting the transmission line under the control of the modulator.

17. The method of claim 16, further comprising using a reflection detector to detect the second data symbols.

18. The method of claim 17, further comprising using additional devices to receive the electrical energy from the transmission line during the power provision phase, receive the first data symbols from the transmission line during the downstream transmission phase, and generate and transmit additional data symbols to the transmission line during the upstream transmission phase.

* * * * *